(12) United States Patent
Kimura et al.

(10) Patent No.: US 10,236,798 B2
(45) Date of Patent: Mar. 19, 2019

(54) VIBRATION ACTUATOR

(71) Applicant: CANON KABUSHIKI KAISHA, Tokyo (JP)

(72) Inventors: Atsushi Kimura, Funabashi (JP); Harushige Yamamoto, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 561 days.

(21) Appl. No.: 14/546,984

(22) Filed: Nov. 18, 2014

(65) Prior Publication Data
US 2015/0137663 A1    May 21, 2015

(30) Foreign Application Priority Data

Nov. 21, 2013    (JP) .................................. 2013-240562

(51) Int. Cl.
| | | |
|---|---|---|
| H02N 2/04 | (2006.01) | |
| H02N 2/02 | (2006.01) | |
| H02N 2/00 | (2006.01) | |

(52) U.S. Cl.
CPC .......... *H02N 2/026* (2013.01); *H02N 2/0015* (2013.01); *H02N 2/0055* (2013.01)

(58) Field of Classification Search
CPC ......... H02N 2/0055; H02N 2/026; H02N 2/04
USPC ....................................... 310/323.09, 323.14
See application file for complete search history.

(56) References Cited

U.S. PATENT DOCUMENTS

| | | | | |
|---|---|---|---|---|
| 3,546,504 A | * | 12/1970 | Bottle ...................... | H02K 5/15 310/216.017 |
| 5,191,688 A | | 3/1993 | Takizawa | |
| 8,018,123 B2 | | 9/2011 | Mukae | |
| 8,368,287 B2 | * | 2/2013 | Kudo ........................ | H02N 2/00 310/323 |
| 2009/0224631 A1 | * | 9/2009 | Mukae ................. | H01L 41/0913 310/323.16 |
| 2010/0060107 A1 | * | 3/2010 | Seki ........................ | H02N 2/004 310/323.16 |
| 2011/0150372 A1 | * | 6/2011 | Care ..................... | F01D 25/164 384/1 |
| 2012/0031209 A1 | * | 2/2012 | Nagaoka ................. | F16H 27/02 74/89 |

(Continued)

FOREIGN PATENT DOCUMENTS

| | | |
|---|---|---|
| JP | 03-222681 A | 10/1991 |
| JP | 2000-324865 A | 11/2000 |

(Continued)

*Primary Examiner* — Bryan P Gordon
(74) *Attorney, Agent, or Firm* — Canon U.S.A., Inc. IP Division

(57) ABSTRACT

A vibration actuator includes a vibrator including an electromechanical transducer and an elastic body, a vibrator fixing member configured to hold the vibrator, a driven member configured to come into frictional contact with the vibrator so as to move relative to the vibrator, a pressing portion configured to press the vibrator against the driven member, a guide portion configured to guide the vibrator in a direction in which the vibrator moves, and a vibration damping member disposed between the vibrator fixing member and the movable plate. The guide portion includes a movable plate configured to move integrally with the vibrator, a rolling member configured to roll in the direction in which the vibrator moves, and a press-and-hold member configured to press the rolling member against the movable plate.

48 Claims, 10 Drawing Sheets

(56) References Cited

U.S. PATENT DOCUMENTS

2015/0200611 A1* 7/2015 Yamamoto ............ H02N 2/026
　　　　　　　　　　　　　　　　　　　310/323.03

FOREIGN PATENT DOCUMENTS

| JP | 2001-292584 A | 10/2001 |
| JP | 2008-178209 A | 7/2008 |
| JP | 2008-220031 A | 9/2008 |
| JP | 2009-033969 A | 2/2009 |
| JP | 2011-234608 A | 11/2011 |

* cited by examiner

VIBRATION ACTUATOR

BACKGROUND OF THE INVENTION

Field of the Invention

The present invention relates to a vibration actuator that causes vibrations in an elastic body and that acquires a driving force using the energy of the vibrations, and particularly to a linear vibration actuator.

Description of the Related Art

Several types of vibration actuators (for example, vibration wave motors) that can highly precisely guide and position a member movable with respect to a stator have been developed.

An example of such vibration actuators is a linear vibration wave motor that linearly drives a driven member, as described in Japanese Unexamined Patent Application Publication No. 3-222681 (corresponding to U.S. Pat. No. 5,191,688) (see FIGS. 13A and 13B).

In the existing technology disclosed in Japanese Unexamined Patent Application Publication No. 3-222681, a movable member 602 is disposed to the inner circumference of a cylindrical stator 601 and a linear vibrator 612 is fixed to the stator 601.

A guide portion is provided at a position opposite a slider 603 across the center axis O of the slider 603. The guide portion includes grooves 602a, 602b, and 602c formed in the movable member 602, grooves 601a, 601b, and 601c formed in the stator 601, and guide members 613a, 613b, and 613c. The stator 601 is disposed around the periphery of the movable member 602.

When the linear vibrator 612 is pressed against the slider 603 disposed on the movable member 602, the movable member 602 is positioned so that the center axis of the movable member 602 coincides with the center axis of the stator 601 and accurately driven in the direction of its center axis.

In Japanese Unexamined Patent Application Publication No. 2001-292584 (see FIGS. 14A and 14B), a pressing spring member 717 is disposed between a vibrator 714 and a stationary plate 719, constituting a guide portion, with rubber sheets 716 and 718 interposed between the pressing spring member 717 and the stationary plate 719 and with a rubber sheet 715 interposed between the pressing spring member 717 and the vibrator 714 at or near a vibration node 714a located at a center portion in the longitudinal direction.

Japanese Unexamined Patent Application Publication No. 2001-292584 describes that such a liner vibration wave motor has a simple and small-sized structure while vibrations are not suppressed by the rubber sheet 715.

In Japanese Unexamined Patent Application Publication No. 2009-33969 (corresponding to U.S. Pat. No. 8,018,123) (see FIGS. 15A and 15B), an actuator body 803 is encased in a casing 804 by pushing a second casing 809 into a first casing 808. Support rubber pieces 851 are disposed so as to face both longitudinal end surfaces 836 of a piezoelectric element 830 and an urging rubber piece 852 is disposed so as to face a center portion of the bottom surface of the piezoelectric element 830. Thus, the piezoelectric element 830 is elastically supported by the casing 804.

An ultrasonic actuator having such a configuration has ease of assembly. Moreover, Japanese Unexamined Patent Application Publication No. 2009-33969 describes that the support rubber pieces 851 do not suppress vibrations since the support rubber pieces 851 are elastic bodies although both longitudinal end surfaces 836 of the piezoelectric element 830 function as antinodes of longitudinal vibrations.

In the configuration described in Japanese Unexamined Patent Application Publication No. 3-222681, however, a fast reciprocating movement of the movable member 602 would affect acceleration due to the sudden accelerating and decelerating motion, thereby causing a moment in a pitching direction on the movable member 602 with respect to the direction in which the movable member 602 is moving.

This is a phenomenon that occurs when the center of gravity of the movable member 602 is separated from the position of a portion at which the driving force is generated.

This moment causes a force on some of the guide members 613a, 613b, and 613c in a direction away from the stator 601 or the movable member 602.

When this force exceeds the pressing force with which the linear vibrator 612 and the movable member 602 press against each other, some of the guide members 613a, 613b, and 613c form a gap between themselves and the grooves 601a, 601b, and 601c of the stator 601 or between themselves and the grooves 602a, 602b, and 602c of the movable member 602 at a position near the turning point of the reciprocating movement.

Thus, the guide members 613a, 613b, and 613c repeatedly become separated from or come into contact with the stator 601 or the movable member 602 at startup or interruption, particularly during continuous reciprocating driving, consequently causing noise.

Particularly, when an optical device performs a focusing operation including a wobbling operation in which a focusing lens is brought into focus on the basis of contrast information of a subject by slightly driving the focusing lens forward or backward along the optical axis, unnecessary noise occurs and is undesirably recorded as an audio record.

In Japanese Unexamined Patent Application Publication No. 2001-292584, the vibrator 714 is supported only at the vibration node 714a. The vibrator 714 is thus rotatable in the pitching direction around the node 714a and apt to rotate. The rotation of the vibrator 714 causes a rail 711a, which is a movable member, to rotate and causes a gap between the rail 711a and a rotating member 712. Consequently, noise occurs at the startup and interruption, particularly during continuous reciprocating driving.

Although Japanese Unexamined Patent Application Publication No. 2009-33969 does not clearly describes a pressing unit that presses the actuator body 803 and a stage 811, which is a driven member and illustrated in FIG. 15B, against each other, the stage 811 rotates in the pitching direction when suddenly accelerates or decelerates and similarly causes noise at linear guides formed by rails 812 or the like.

SUMMARY OF THE INVENTION

An aspect of the present invention is a vibration actuator including a vibrator including an electromechanical transducer and an elastic body, a vibrator fixing member configured to hold the vibrator, a driven member configured to come into frictional contact with the vibrator so as to move relative to the vibrator, a pressing portion configured to press the vibrator against the driven member, a guide portion configured to guide the vibrator in a direction in which the vibrator moves, and a vibration damping member disposed between the vibrator fixing member and the movable plate. The guide portion includes a movable plate configured to move integrally with the vibrator, a rolling member configured to roll in the direction in which the vibrator moves, and a press-and-hold member configured to press the rolling member against the movable plate.

Another aspect of the present invention is a vibration actuator including a vibrator including an electromechanical transducer and an elastic body, a driven member configured to come into frictional contact with the vibrator so as to move relative to the vibrator, a vibrator fixing member configured to hold the vibrator, a frame configured to hold the driven member, a pressing portion configured to press the vibrator against the driven member, a guide portion configured to guide the vibrator in a direction of the relative movement of the vibrator and the driven member, and a vibration damping member disposed between the driven member and the frame. The guide portion includes a movable plate configured to move integrally with the vibrator, a rolling member configured to roll in the direction of the relative movement, and a press-and-hold member configured to press the rolling member against the movable plate.

Another aspect of the present invention is a vibration actuator including a vibrator including an electromechanical transducer and an elastic body, a driven member configured to come into frictional contact with the vibrator so as to move relative to the vibrator, a pressing portion configured to press the vibrator against the driven member, a guide portion that guides the driven member in a direction of the relative movement of the vibrator and the driven member, and a vibration damping member disposed between the driven member and the movable plate. The guide portion includes a movable plate configured to move integrally with the driven member, a rolling member configured to roll in the direction of the relative movement, and a press-and-hold member configured to press the rolling member against the movable plate.

Another aspect of the present invention is a vibration actuator including a vibrator including an electromechanical transducer and an elastic body, a driven member configured to come into frictional contact with the vibrator so as to move relative to the vibrator, a vibrator fixing member configured to hold the vibrator, a frame configured to hold the vibrator fixing member, a pressing portion configured to guide the vibrator against the driven member, a guide portion that guides the driven member in a direction of the relative movement of the vibrator and the driven member, and a vibration damping member disposed between the vibrator fixing member and the frame. The guide portion including a movable plate configured to move integrally with the driven member, a rolling member configured to roll in the direction of the relative movement, and a press-and-hold member configured to press the rolling member against the movable plate.

Further features of the present invention will become apparent from the following description of exemplary embodiments (with reference to the attached drawings).

DESCRIPTION OF THE EMBODIMENTS

An aspect of the present invention enables reduction of noise that occurs at acceleration and/or deceleration or at a fast reciprocating operation. For example, when a vibration actuator according to an aspect of the present invention is used as a focus-lens driving source of an optical device, the vibration actuator can be formed as a small-sized linear vibration actuator that causes less unnecessary noise in a wobbling operation. Thus, a small-sized linear vibration actuator that drives a focusing lens and that causes less noise in a wobbling operation during video shooting and at the startup and interruption during still image shooting can be obtained.

Hereinbelow, embodiments of the present invention will be described.

EMBODIMENTS

First Embodiment

Referring to FIGS. 1, 2, 3, and 4, an example of the configuration of a vibration actuator according to a first embodiment, which is used as a focus-lens driving source of an optical device, is described.

Figure 1:
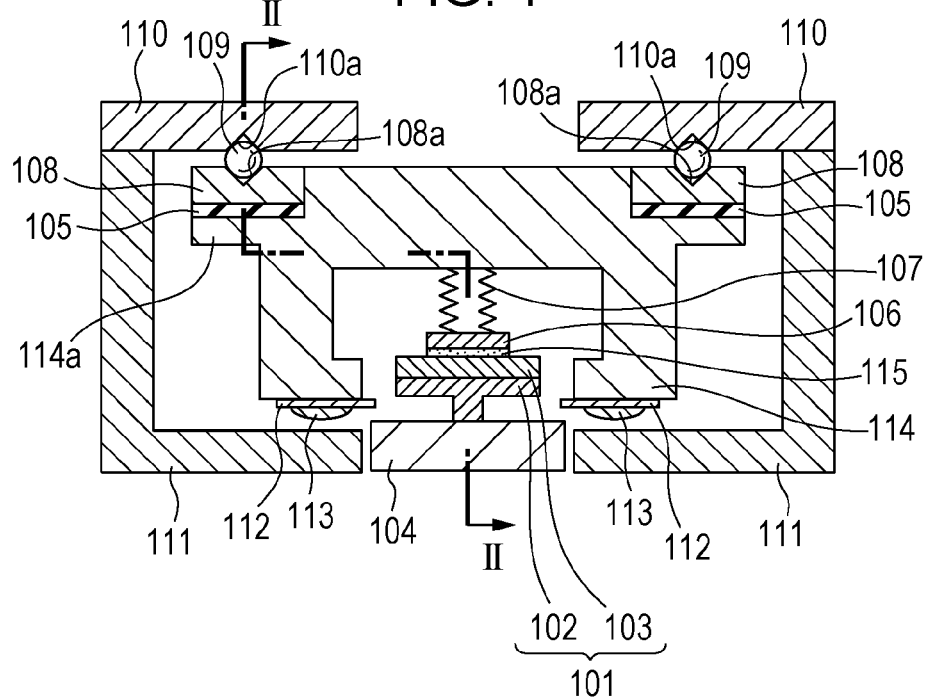
FIG. 1 is a cross-sectional view of a main portion of a vibration actuator (a cross-sectional view taken perpendicularly to a driving direction).
Figure 2:
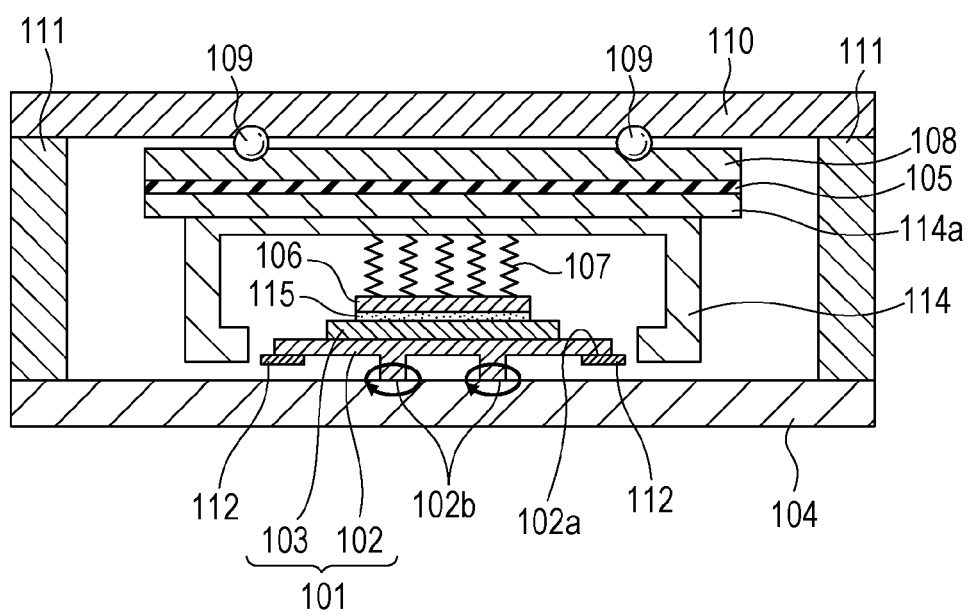
FIG. 2 is a cross-sectional view of a main portion of the vibration actuator (a cross-sectional view taken in the driving direction).
Figure 3:
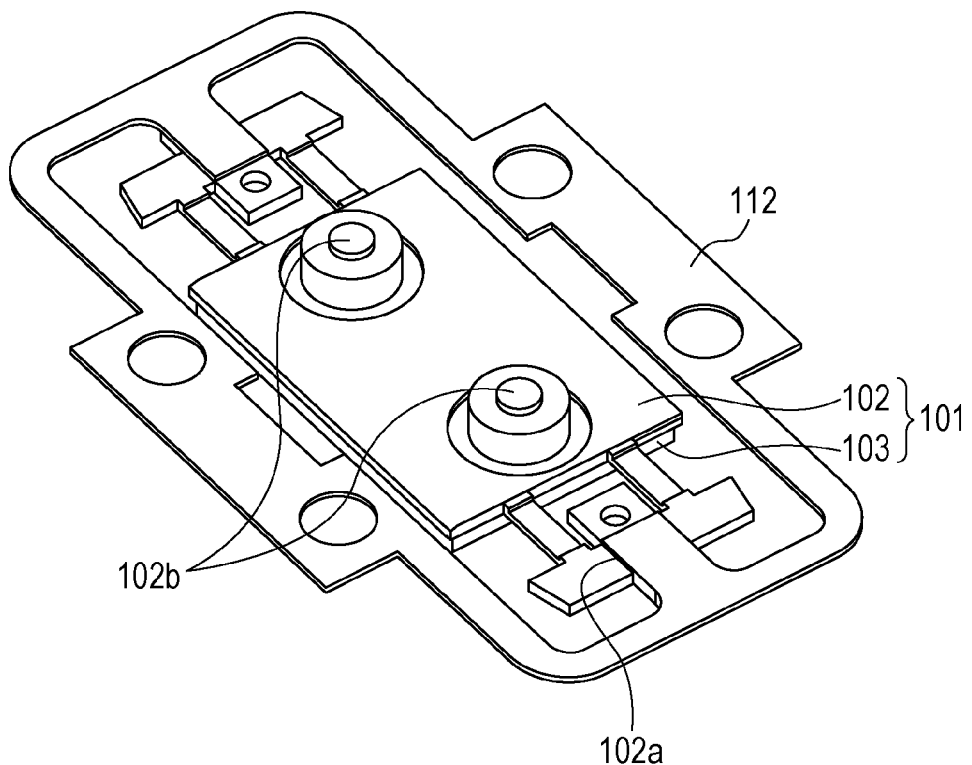
FIG. 3 is a perspective view of a vibrator to which a support member of the vibration actuator is connected.
Figure 4:
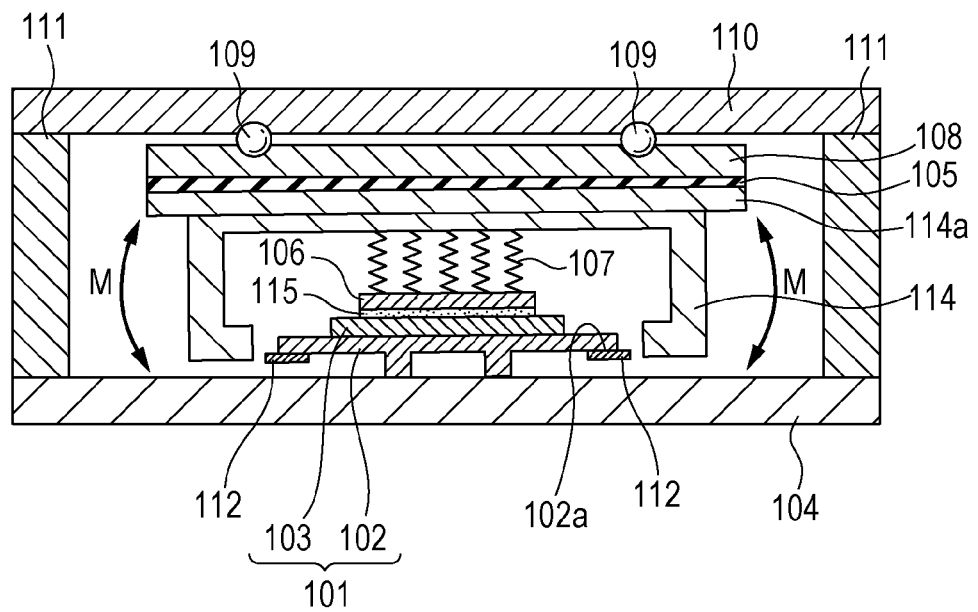
FIG. 4 is a cross-sectional view of a main portion of a vibration actuator to illustrate an effect of the vibration actuator (a cross-sectional view taken in the driving direction).

FIG. 1 is a cross-sectional view of a main portion of the vibration actuator (a cross-sectional view taken perpendicularly to the driving direction), FIG. 2 is a cross-sectional view of the vibration actuator taken in the driving direction, FIG. 3 is a perspective view of a vibrator to which a support member is connected, and FIG. 4 is a cross-sectional view of the vibration actuator taken in the driving direction to illustrate an effect of the vibration actuator according to the embodiment.

Here, FIG. 2 is a cross-sectional view of the vibration actuator taken along the alternate long and short dash line II-II of FIG. 1.

The vibration actuator according to the embodiment includes an electromechanical transducer and a vibrator, which is formed of an elastic body. The vibration actuator causes a driven member to come into frictional contact with the vibrator and moves the driven member and the vibrator relative to each other.

This configuration is specifically described. A vibrator 101 has a configuration disclosed, for example, in Japanese Unexamined Patent Application Publication No. 2011-234608. The vibrator 101 includes an elastic body 102 and a piezoelectric element 103, which is connected to the elastic body 102 by bonding or by other ways.

The elastic body 102 is coupled to a support member 112 at junctions 102a by welding or by other ways (see FIG. 2 and FIG. 3).

When a high frequency voltage is applied to the piezoelectric element 103, the vibrator 101 vibrates so as to bend in the longitudinal direction and the lateral direction.

Consequently, as illustrated in FIG. 2, the tips of pressure contact portions 102b formed in the elastic body 102 vibrate elliptically. Changing the frequency or the phase of the high frequency voltage applied to the piezoelectric element 103 appropriately changes the direction or the ellipse ratio of the rotation of the pressure contact portions 102b, so that the pressure contact portions 102b can be caused to move in a desired manner. Thus, the vibrator 101 causes a driving force using a frictional force that occurs due to the friction between itself and a slider 104 (a driven member), which is a counterpart slidable member relative to which the vibrator 101 slides, and thus becomes movable along the optical axis (in the direction perpendicular to the sheet surface of FIG. 1 or in the lateral direction of FIG. 2). In short, the slider 104 and the vibrator 101 are movable relative to each other by coming into frictional contact with each other.

Referring to FIG. 1, a vibrator fixing member 114 holds the vibrator 101 and the support member 112 coupled with the vibrator 101 (as illustrated in FIG. 2) is fixed in place with screws 113.

A pressing portion includes a pressing plate 106 and a pressing spring 107. The pressing plate 106 presses the vibrator 101 against the slider 104 with a felt piece 115 (a vibration isolating member) interposed between the pressing plate 106 and the vibrator 101. Here, the vibration isolating member has a function with which to minimize transmission of vibrations from the vibrator 101 to the pressing portion without preventing the vibrator 101 from vibrating. The vibration isolating member is not limited to the felt piece and examples of the vibration isolating member include a sponge.

A movable plate 108 is fixed to a contact portion 114a of the vibrator fixing member 114 by being screwed thereon or by other ways with a rubber sheet 105 (a vibration damping member) interposed therebetween. The movable plate 108 constitutes part of a guide portion that receives a reaction force caused in response to a pressing force. The movable plate 108 moves integrally with the vibrator 101.

The movable plate 108 has multiple V-shaped grooves 108a into which balls 109, which are rolling members, are fitted and that guide the vibrator fixing member 114 in the direction of the optical axis. The balls 109 are rotatable in the direction in which the vibrator 101 and the slider 104 move relative to each other.

A press-and-hold member 110 is fixed to a frame 111 with screws or the like and presses the balls 109 against the movable plate 108.

The press-and-hold member 110 also constitutes part of the guide portion.

The balls 109 are tightly held between the V-shaped grooves 108a of the movable plate 108 and V-shaped grooves 110a formed in the press-and-hold member 110, which are formed so as to be opposite the V-shaped grooves 108a, whereby the vibrator fixing member 114 is supported so as to be movable in the driving direction. In other words, the press-and-hold member 110 presses the balls 109 against the movable plate 108.

At this time, the movable plate 108 is movable in the driving direction (in the direction perpendicular to the sheet surface of FIG. 1) with respect to the press-and-hold member 110 using the rolling function of the balls 109. This configuration enables the guide portion to guide the vibrator 101 in the direction in which the vibrator 101 is moved relative to the slider 104.

The slider 104 is fixed to the frame 111 with screws or the like at positions near both end portions in the longitudinal direction (here, the driving direction). In FIG. 1, the V-shaped grooves 108a of the movable plate 108 and the V-shaped grooves 110a of the press-and-hold member 110 do not necessarily have to be V-shaped. At least one of the grooves may have a smooth curve shape.

A motor unit of the vibration actuator according to the embodiment of the present invention has the above-described configuration.

Figure 5:
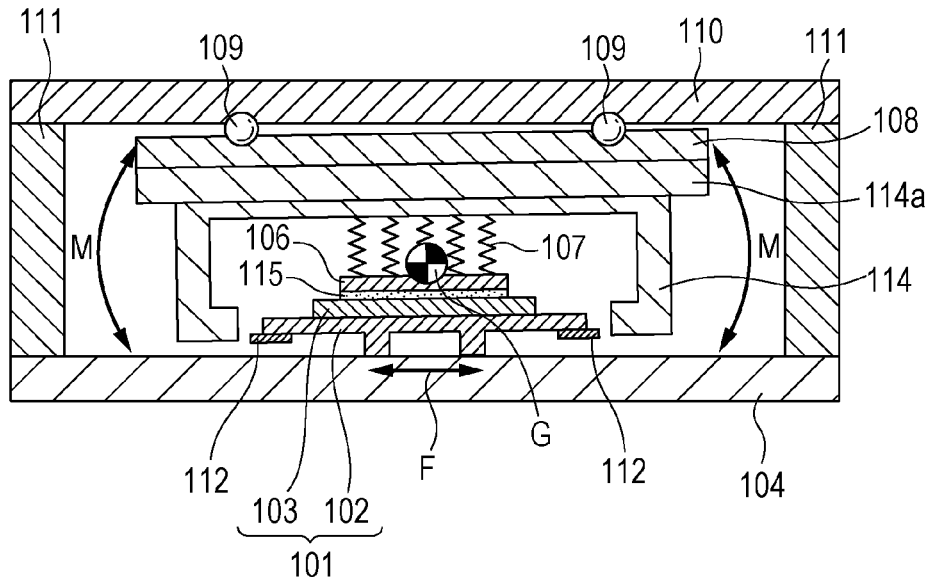
FIG. 5 is a cross-sectional view of a main portion of a vibration actuator to illustrate the configuration of the vibration actuator (cross-sectional view taken in the driving direction).

FIG. 5 is a schematic diagram of an existing configuration.

In FIG. 5, components that are the same as those of the first embodiment of the present invention are denoted by the same symbols illustrated in FIG. 1 and FIG. 2.

In an existing actuator, the contact portion 114a of the vibrator fixing member 114 and the movable plate 108 are directly fixed together without a rubber sheet interposed between the contact portion 114a and the movable plate 108.

Thus, as described above, when an optical device performs a focusing operation including a wobbling operation in which, for example, a focusing lens is brought into focus on the basis of contrast information of a subject by slightly driving the focusing lens forward or backward along the optical axis, the silence required for shooting is impaired.

Specifically, the difference between the position at which the vibrator 101, which is a driving-force generating portion, and the slider 104 come into contact with each other (position at which a force F in FIG. 5 occurs) and the center of gravity (G in FIG. 5) of a driving portion that moves integrally with the vibrator 101 causes a moment M in a pitching direction with respect to the moving direction of the vibrator 101.

When a force causing the moment M exceeds the reaction force against the pressing force, the vibrator fixing member 114 rotates in the pitching direction and accordingly the movable plate 108 also rotates.

At this time, a gap is formed between the balls 109 and the V-shaped grooves formed in the movable plate 108 and the press-and-hold member 110. By continuously performing the wobbling operation, impact sounds consecutively occur between the V-shaped grooves and the balls, thereby impairing the silence required for shooting. Also in the still image shooting, impact sounds occur at the startup and interruption.

On the other hand, the configuration according to the embodiment illustrated in FIG. 1 and FIG. 2 includes rubber sheets 105, serving as vibration damping members, between the contact portions 114a of the vibrator fixing member 114 and the movable plate 108.

Thus, the rotational movement of the vibrator fixing member 114 at acceleration and/or deceleration is absorbed by the rubber sheet 105 as illustrated in FIG. 4, so that the generation of a gap between the balls 109 and the V-shaped grooves 108a or 110a can be prevented, consequently reducing impact sounds between the balls 109 and the V-shaped grooves 108a or 110a.

In this manner, a vibration actuator that can reduce noise that occurs at acceleration and/or deceleration or in a fast reciprocating operation can be obtained.

Second Embodiment

Figure 6:
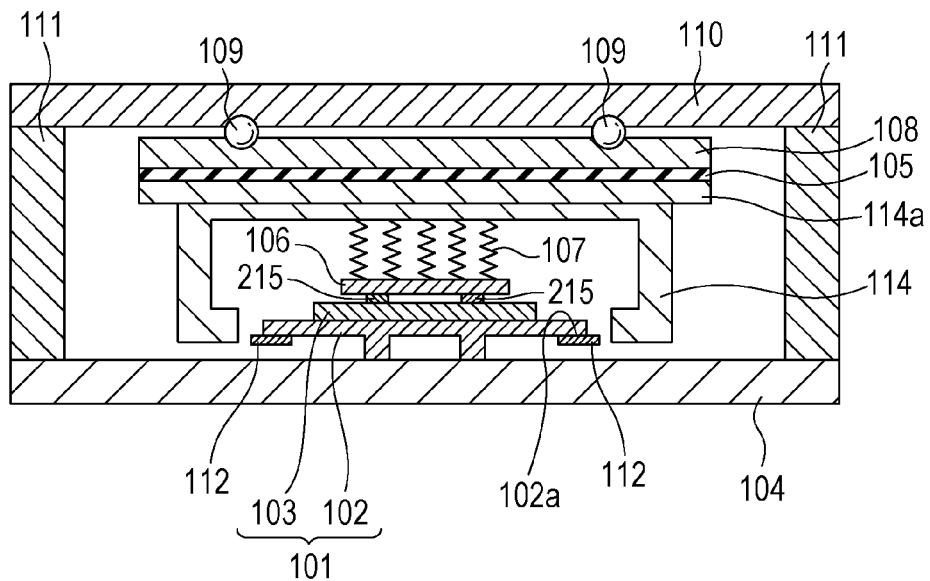
FIG. 6 is a cross-sectional view of a main portion of a vibration actuator (a cross-sectional view taken in the driving direction).

Referring to FIG. 6, an example of the configuration of a vibration actuator according to a second embodiment used as a focus-lens driving source of an optical device is described.

FIG. 6 is a cross-sectional view of a main portion of the vibration actuator (a cross-sectional view taken in the driving direction). In FIG. 6, components that are the same as those of the first embodiment of the present invention are denoted by the same symbols as those in FIG. 2.

The vibration actuator according to the second embodiment is different from the vibration actuator according to the first embodiment in that the vibration actuator according to the second embodiment includes felt pieces 215 disposed, not over the entire surface of the piezoelectric element 103, but at two portions so as to be symmetric with respect to the center of the vibrator 101 in the driving direction. This configuration reduces the area over which the felt pieces and the piezoelectric element come into contact with each other, whereby the degree to which the felt pieces 215 suppress vibrations of the vibrator 101 can be further reduced. Particularly, the degree to which the felt pieces 215 suppress vibrations of the vibrator 101 can be minimized since the felt pieces 215 are disposed near the longitudinal bending vibration node, which is closely related to the driving speed.

In this manner, a vibration actuator that can reduce noise that occurs at acceleration and/or deceleration and in a fast reciprocating operation can be obtained.

Third Embodiment

Figure 7:
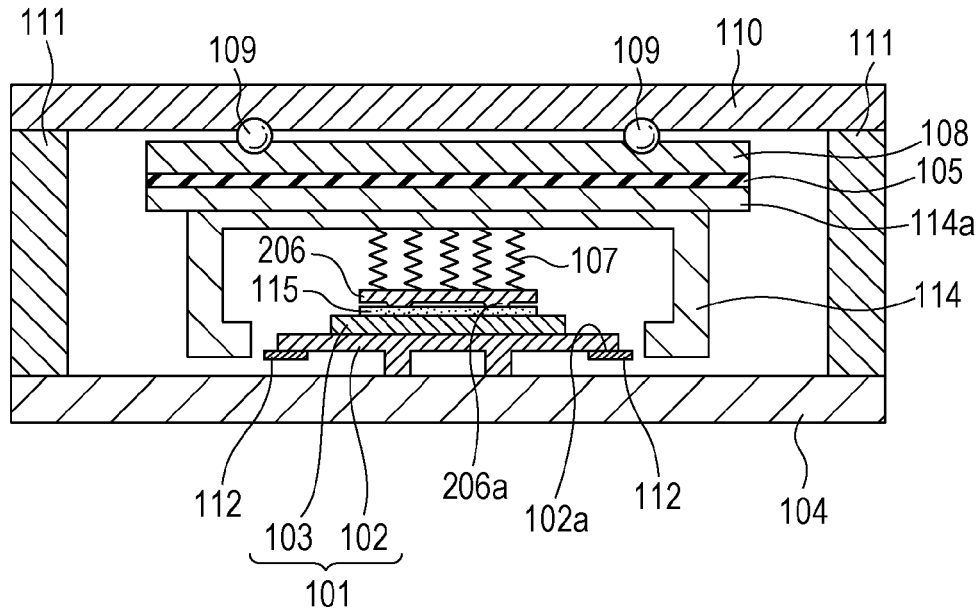
FIG. 7 is a cross-sectional view of a main portion of a vibration actuator (a cross-sectional view taken in the driving direction).

Referring to FIG. 7, an example of the configuration of a vibration actuator according to a third embodiment used as a focus-lens driving source of an optical device is described.

FIG. 7 is a cross-sectional view of a main portion of the vibration actuator (a cross-sectional view taken in the driving direction). In FIG. 7, components that are the same as those of the first embodiment of the present invention are denoted by the same symbols as those in FIG. 2.

The vibration actuator according to the third embodiment is different from the vibration actuator according to the first embodiment in that the vibration actuator according to the third embodiment includes a pressing plate 206 that has protrusions 206a on the side facing the felt piece 115. The protrusions 206a are disposed at two portions so as to be symmetric with respect to the center of the vibrator 101 in the driving direction and most of the pressing force is received at these two portions. Thus, the effects that are similar to those according to the second embodiment can be obtained. Particularly, the degree to which the felt piece 115 suppresses vibrations of the vibrator 101 can be minimized since the protrusions 206a are disposed near the longitudinal bending vibration node, which is closely related to the driving speed.

Figure 8:
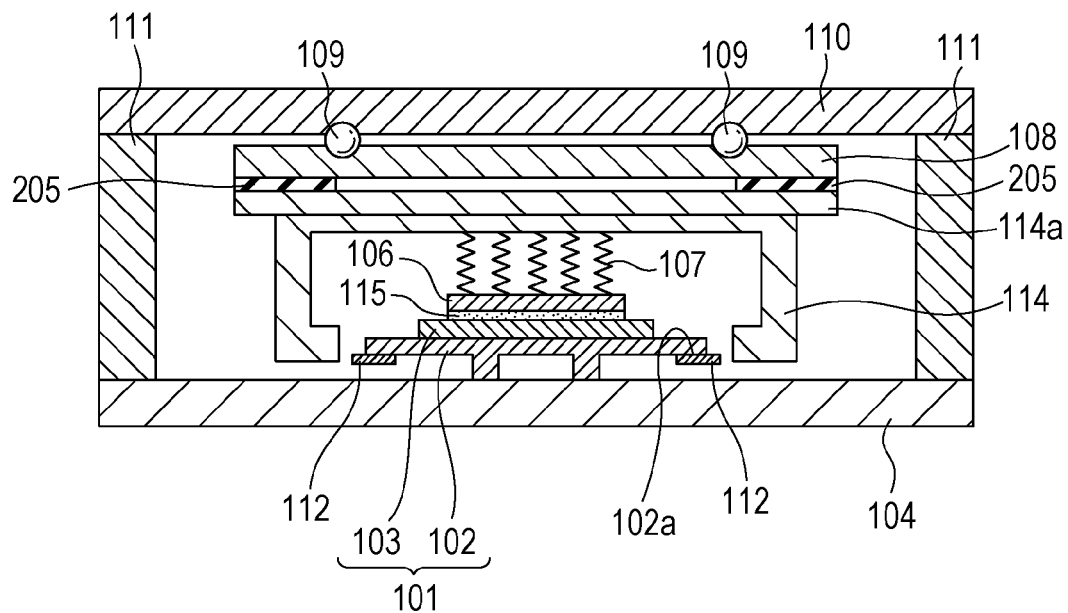
FIG. 8 is a cross-sectional view of a main portion of a vibration actuator (a cross-sectional view taken in the driving direction).

The first, second, and third embodiments illustrate the case where the rubber sheet 105 is disposed over the entire surfaces of the vibrator fixing member 114 and the movable plate 108 in the driving direction. However, rubber sheets may be disposed so as to be symmetric with respect to the center of the vibrator in the driving direction since the rubber sheets only have to be capable of attenuating the moment M in a pitching direction with respect to the driving direction, as in the case of rubber sheets 205 illustrated in FIG. 8. Thus, the rubber sheets 205 may be disposed on both end portions of the vibrator fixing member 114 or the movable plate 108 in the driving direction. Alternatively, the rubber sheets 205 may be disposed so as to be symmetric with respect to the center of the vibrator fixing member 114 or the movable plate 108 at any two portions other than both end portions and the center of the vibrator fixing member 114 or the movable plate 108 in the driving direction. The rubber sheet 105 of FIG. 2 only has to cover an area over which the balls 109 roll in the driving direction and does not necessarily have to be disposed up to both ends of the vibrator fixing member 114 or the movable plate 108 as long as it is disposed so as to be symmetrical about the center of the vibrator 101. In this description, the wording that a certain member is symmetrical about the center or certain members are symmetric with respect to the center applies not only to the case where the member is completely symmetrical about the center or the members are completely symmetric with respect to the center but also to the case where the member is substantially symmetrical about the center or the members are substantially symmetric with respect to the center.

In this manner, a vibration actuator that can reduce noise that occurs at acceleration and/or deceleration or in a fast reciprocating operation can be obtained.

Fourth Embodiment

Figure 9:
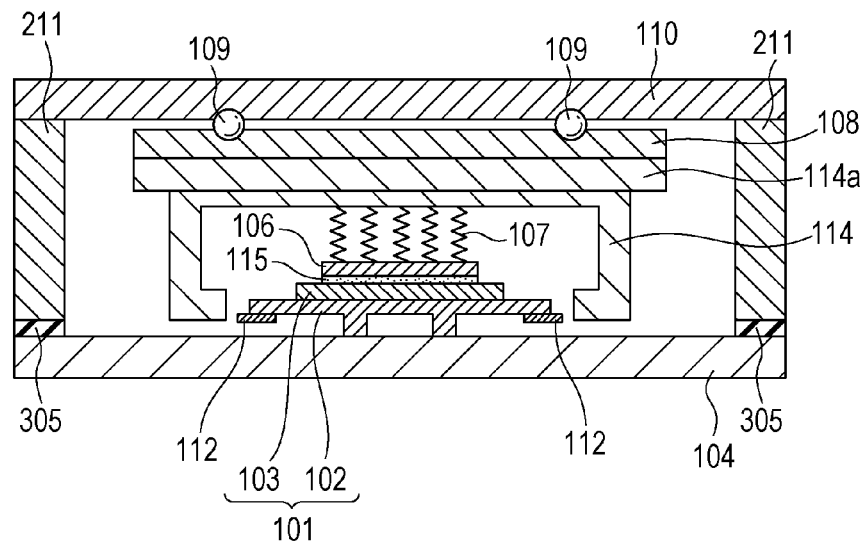
FIG. 9 is a cross-sectional view of a main portion of a vibration actuator (a cross-sectional view taken in the driving direction).
Figure 10:
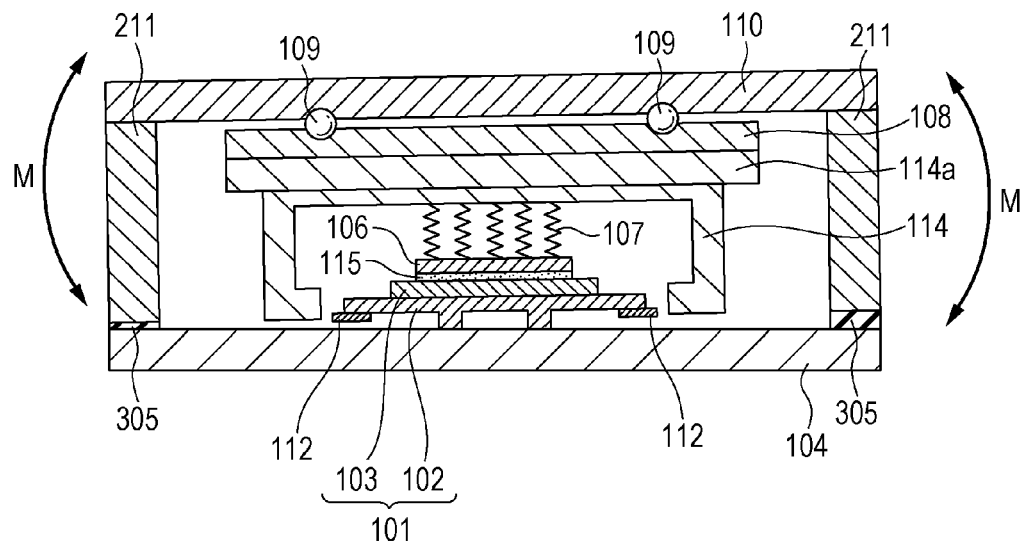
FIG. 10 is a cross-sectional view of a main portion of a vibration actuator to illustrate an effect of the vibration actuator (a cross-sectional view taken in the driving direction).

Referring now to FIGS. 9 and 10, an example of the configuration of a vibration actuator according to a fourth embodiment, which is a modification of the first embodiment illustrated in FIG. 2, is described.

FIG. 9 is a cross-sectional view of a main portion of the vibration actuator (a cross-sectional view taken in the driving direction). FIG. 10 is a cross-sectional view of the vibration actuator taken in the driving direction to illustrate the effects of the vibration actuator.

In FIGS. 9 and 10, components that are the same as those in the first embodiment are denoted by the same symbols as those in FIG. 2.

In this embodiment, instead of providing a rubber sheet between the contact portion 114a of the vibrator fixing member 114 and the movable plate 108, a rubber sheet 305 (a vibration damping member) is interposed between the slider 104 and a frame 211. The frame 211 holds the slider 104, which is a driven member.

In this configuration, components such as the vibrator fixing member 114, the frame 211, and the press-and-hold member 110 integrally rotate in the pitching direction due to the moment M in a pitching direction with respect to the direction of movement at acceleration and/or deceleration. By absorbing the movement using the rubber sheet 305, serving as a vibration damping member, as illustrated in FIG. 10, formation of gaps between the V-shaped grooves and the balls are prevented, whereby noise can be reduced.

In this manner, a vibration actuator that can reduce noise that occurs at acceleration and/or deceleration or in a fast reciprocating operation can be obtained.

Fifth Embodiment

Figure 11:
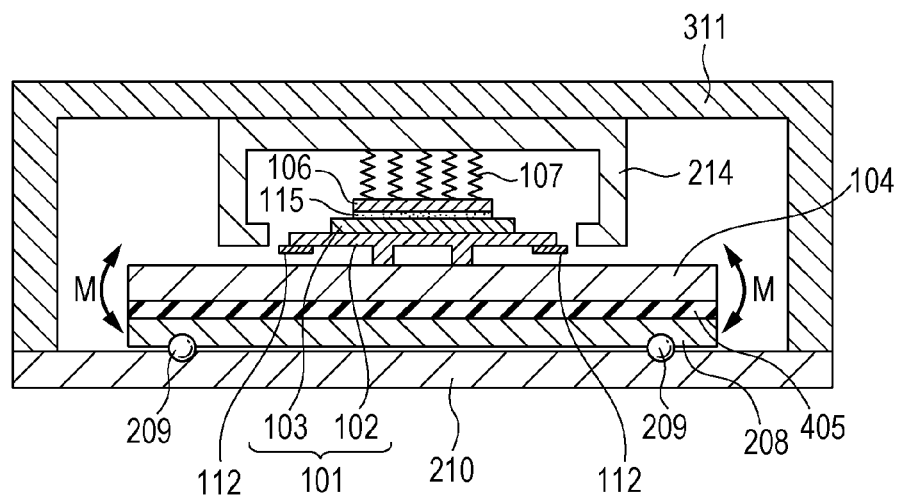
FIG. 11 is a cross-sectional view of a main portion of a vibration actuator (a cross-sectional view taken in the driving direction).

Referring now to FIG. 11, an example of the configuration of a vibration actuator according to a fifth embodiment used as a focus-lens driving source of an optical device in which a slider is movable is described.

FIG. 11 is a cross-sectional view of a main portion of the vibration actuator (a cross-sectional view taken in the driving direction).

In FIG. 11, components that are the same as those in the fourth embodiment are denoted by the same symbols as those in FIG. 9.

In FIG. 11, a vibrator fixing member 214 is held by a frame 311 and a movable plate 208 is fixed to the slider 104 with a rubber sheet 405 (a vibration damping member) interposed therebetween by being screwed or by other ways.

The movable plate 208 has V-shaped grooves into which balls 209, serving as rolling members, are fitted and that guide the slider 104 in the direction of the optical axis.

A press-and-hold member 210 is fixed to the frame 311 using screws or the like. The press-and-hold member 210 also constitutes part of the guide portion. The balls 209 are tightly held between the V-shaped grooves of the movable plate 208 and V-shaped grooves formed in the press-and-hold member 210, which are formed opposite the V-shaped grooves of the movable plate 208, whereby the press-and-hold member 210 is capable of supporting the slider 104 so that the slider 104 is movable in the driving direction.

At this time, the movable plate 208 is also movable in the driving direction (the lateral direction in FIG. 11) relative to the press-and-hold member 210 by the rolling function of the balls 209. The V-shaped grooves of the movable plate 208 and the V-shaped grooves of the press-and-hold member 210 do not necessarily have to be V-shaped. At least one of the grooves may have a smooth curve shape.

As described above, when an optical device performs a focusing operation including a wobbling operation in which, for example, a focusing lens is brought into focus on the basis of contrast information of a subject by slightly driving the focusing lens forward or backward along the optical axis, a moment M in a pitching direction with respect to the moving direction occurs. When a force causing the moment M exceeds the reaction force against the pressing force, the slider 104 rotates in the pitching direction.

On the other hand, in this embodiment, the rubber sheet 405 is interposed between the slider 104 and the movable plate 208. Thus, the rotational movement of the slider 104 at acceleration and/or deceleration is absorbed by the rubber sheet 405, constituting a vibration damping member, so that formation of a gap between the V-shaped grooves and the balls 209 can be prevented. Consequently, impact sounds can be reduced.

In this manner, a vibration actuator that can reduce noise that occurs at acceleration and/or deceleration or in a fast reciprocating operation can be obtained.

In this embodiment, the rubber sheet 405 is disposed over the entire surface of the slider 104 or the movable plate 208 in the driving direction as illustrated in FIG. 11. However, the rubber sheet or sheets 405 may have another shape or may be arranged in a different manner as long as it is or they are disposed so as to be symmetrical about the center of the slider 104 or the movable plate 208 in the driving direction or symmetric with respect to the center of the slider 104 or the movable plate 208 in the driving direction. For example, the rubber sheets may be disposed only at two portions, at both end portions of the slider 104 or the movable plate 208 in the driving direction.

Sixth Embodiment

Figure 12:
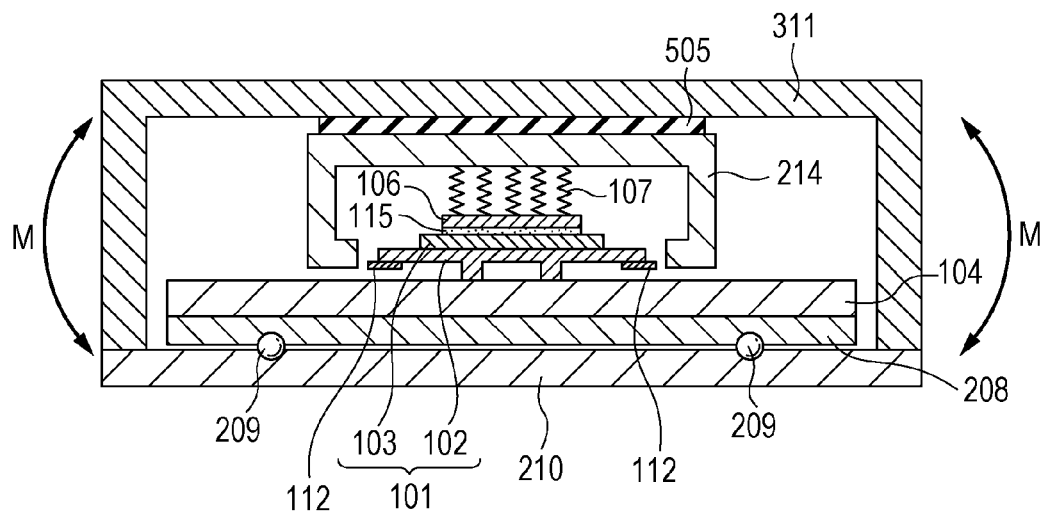
FIG. 12 is a cross-sectional view of a main portion of a vibration actuator (a cross-sectional view taken in the driving direction).
Figure 13A:
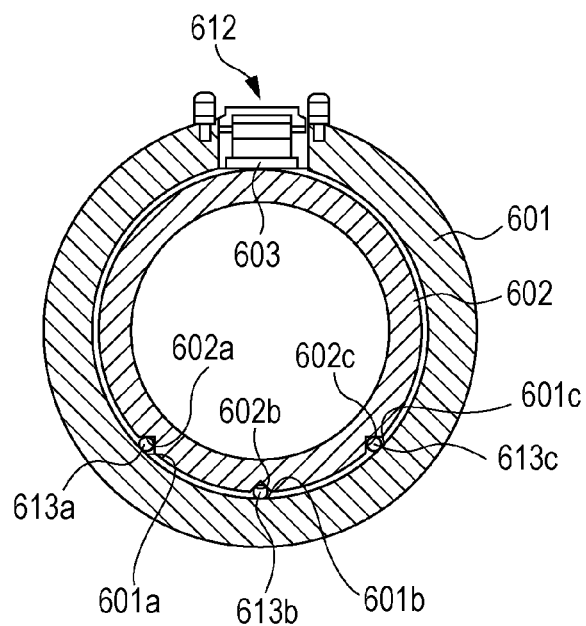
FIGS. 13A and 13B illustrate, in a cross section, the configuration of a linear vibration wave motor according to Japanese Unexamined Patent Application Publication No. 3-222681.
Figure 13B:
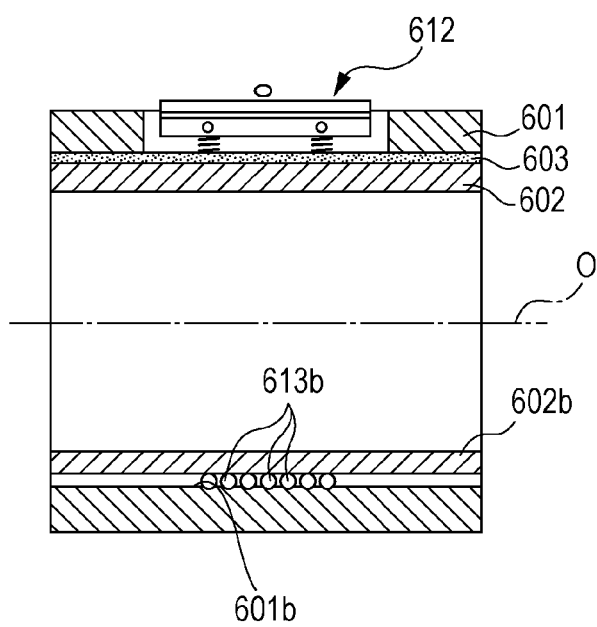
Figure 14A:
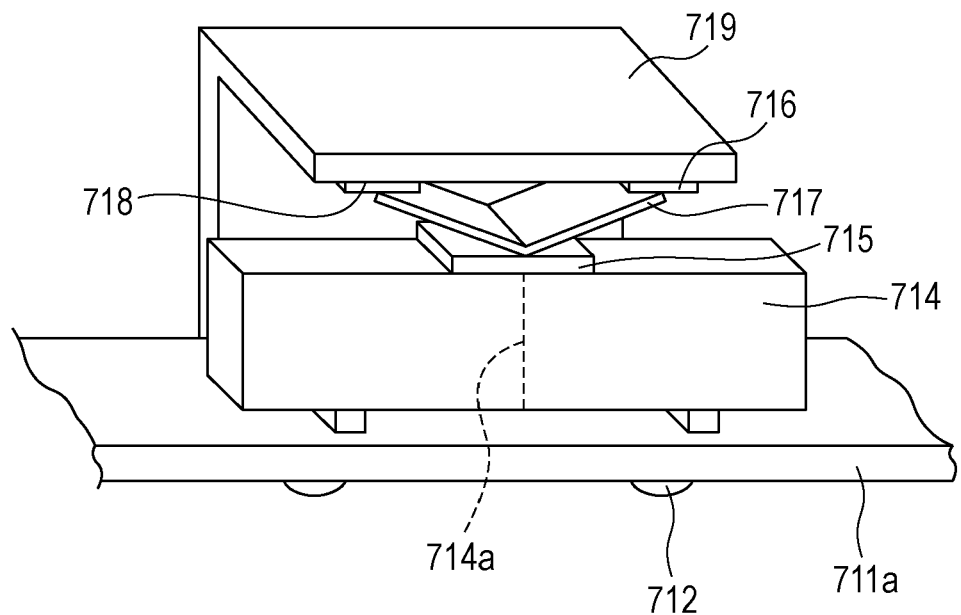
FIGS. 14A and 14B illustrate the configuration of a linear vibration wave motor according to Japanese Unexamined Patent Application Publication No. 2001-292584.
Figure 14B:
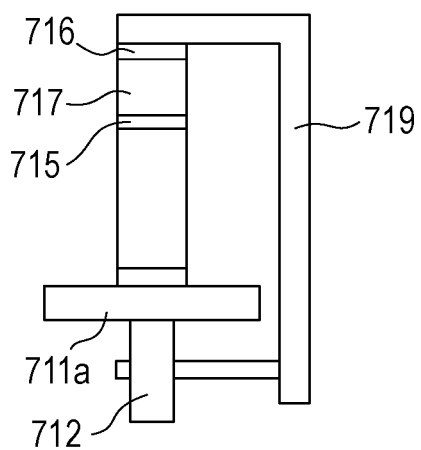
Figure 15A:
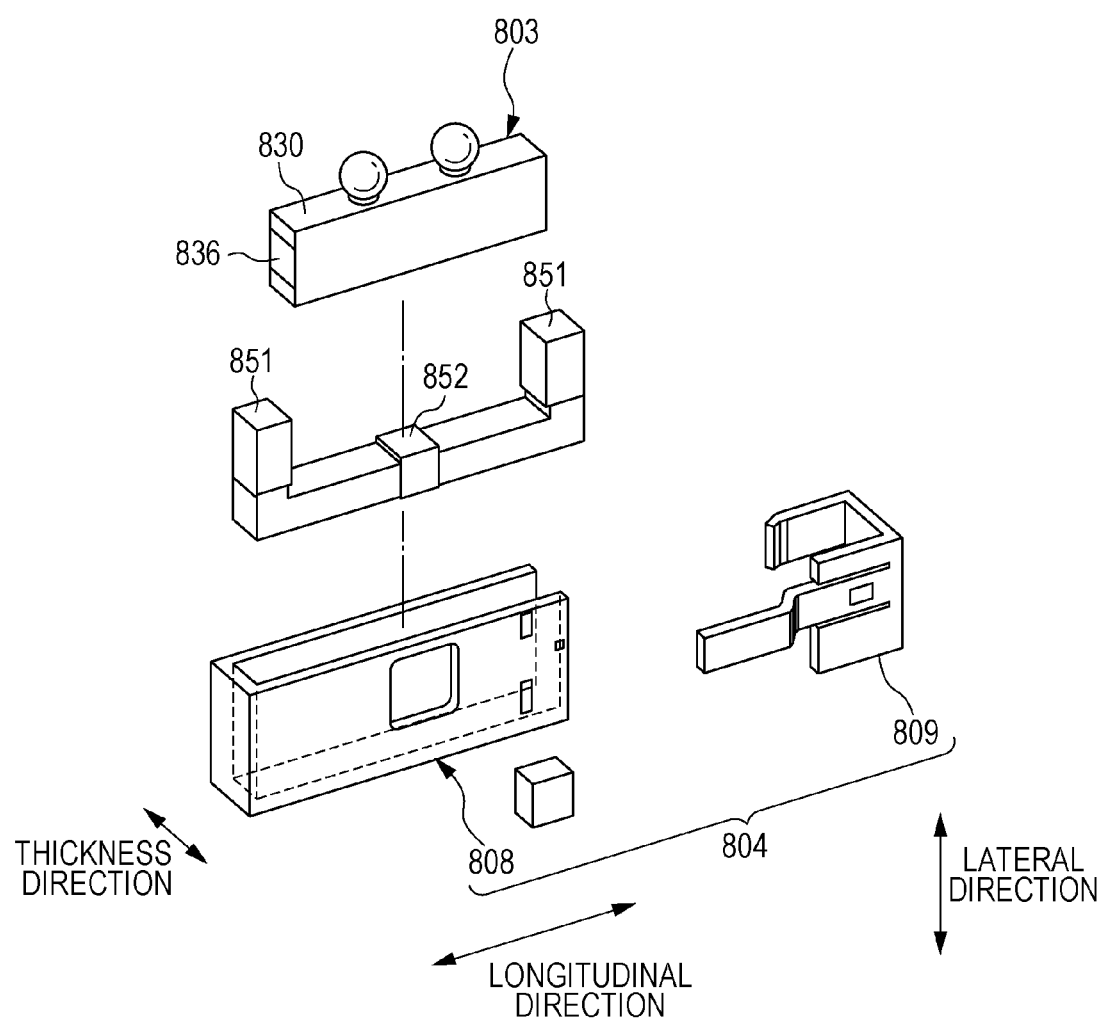
FIGS. 15A and 15B illustrates the configuration of a linear vibration wave motor according to Japanese Unexamined Patent Application Publication No. 2009-33969.
Figure 15B:
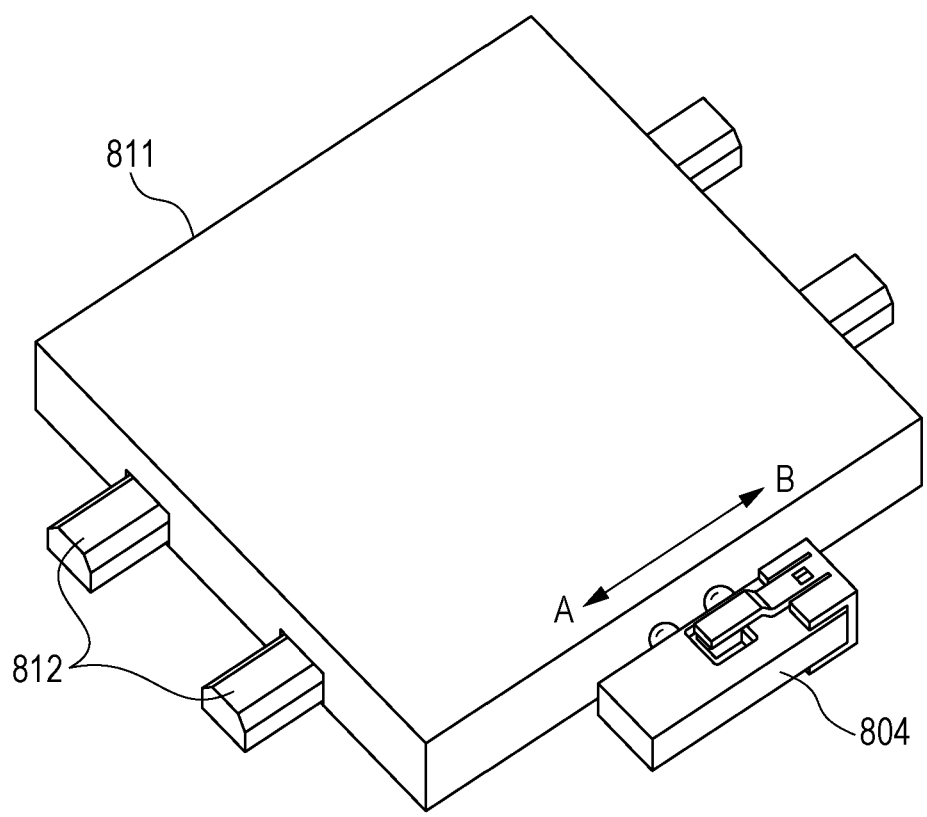

Referring to FIG. 12, an example of the configuration of a vibration actuator according to a sixth embodiment, which is a modification of the fifth embodiment illustrated in FIG. 11, is described.

FIG. 12 is a cross-sectional view of a main portion of the vibration actuator (a cross-sectional view taken in the driving direction).

In FIG. 12, components that are the same as those of the fifth embodiment are denoted by the same symbols as those in FIG. 11.

In this embodiment, instead of providing a rubber sheet between the slider 104 and the movable plate 208, a rubber sheet 505 (a vibration damping member) is interposed between the vibrator fixing portion 214 and the frame 311.

In this configuration, components such as the slider 104, the frame 311, and the press-and-hold member 210 integrally rotate in the pitching direction due to the moment M in a pitching direction with respect to the direction of movement at acceleration and/or deceleration. The movement is absorbed by the rubber sheet 505, serving as a vibration damping member. Thus, formation of gaps between the V-shaped grooves and the balls 209 are prevented, whereby noise can be reduced. In this manner, a vibration actuator that can reduce noise that occurs at acceleration and/or deceleration or in a fast reciprocating operation can be obtained.

In this embodiment, the rubber sheet 505 is disposed over the entire surface of the vibrator fixing member 214 in the driving direction as illustrated in FIG. 12. However, the rubber sheet or sheets 505 may have another shape or may be arranged in a different way as long as it is or they are disposed so as to be symmetrical about the center of the vibrator fixing member 214 in the driving direction or symmetric with respect to the center of the vibrator fixing member 214 in the driving direction. For example, rubber sheets may be disposed only at two portions, at both end portions of the vibrator fixing member 214 in the driving direction.

Alternatively, in the first to sixth embodiments, at least one of the movable plate 108 or 208, the press-and-hold member 110 or 210, and the balls 109 or 209 may be made of resin so that impact sounds can be reduced further.

Vibration actuators according to some embodiments of the present invention have been specifically described in detail thus far. The invention is applicable not only to linear actuators, as described in the embodiments, but also to any form of actuators including a rotary actuator and an actuator that has multiple degrees of freedom within the scope of claims.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-240562, filed Nov. 21, 2013, which is hereby incorporated by reference herein in its entirety.

What is claimed is:

1. A vibration actuator, comprising:
a vibrator including an electromechanical transducer and an elastic body;
a vibrator fixing member configured to hold the vibrator;
a contact member disposed in contact with the vibrator;
a guide portion configured to guide the vibrator in a direction in which the vibrator moves by relative movement of the vibrator and the contact member, the guide portion including a vibration damping member disposed in the vibrator fixing member; a movable plate; a rolling member configured to roll in the direction; and a hold member disposed so as to hold the rolling member between the movable plate and the hold member;
wherein the vibration damping member, the movable plate, the rolling member, and the hold member are disposed in this order, and, in relation to the movable plate, the vibration damping member is disposed on the vibrator side only, and
wherein the vibrator, the vibrator fixing member, the vibration damping member, and the movable plate are configured to be able to move integrally in relation to the contact member.

2. The vibration actuator according to claim 1, further comprising:
a pressing portion configured to press the vibrator against the contact member between the vibrator and the vibrator fixing member; and
a vibration isolating member disposed between the pressing portion and the vibrator.

3. The vibration actuator according to claim 2, wherein vibration isolating members each being the vibration isolating member disposed between the pressing portion and the vibrator are disposed so as to be substantially symmetric with respect to a center of the vibrator in the direction in which the vibrator moves.

4. The vibration actuator according to claim 2, wherein the pressing portion includes protrusions on a surface that is in contact with the vibration isolating member, the protrusions being located so as to be substantially symmetric with respect to a center of the vibrator in a direction in which the vibrator moves.

5. The vibration actuator according to claim 1, wherein vibration damping members, each being the vibration damping member disposed between the vibrator fixing member and the movable plate, are disposed between the vibrator fixing member and the movable plate so as to be substantially symmetric with respect to a center of the vibrator in a direction in which the vibrator is driven.

6. The vibration actuator according to claim 5, wherein the vibration damping members are disposed on both end portions of the vibrator fixing member or the movable plate in the direction in which the vibrator is driven.

7. The vibration actuator according to claim 1, wherein at least one of the movable plate and the hold member includes a groove in and along which the rolling member rolls in the direction in which the vibrator moves.

8. The vibration actuator according to claim 1, wherein at least one of the movable plate, the rolling member, and the hold member contains resin.

9. A vibration actuator, comprising:
a vibrator including an electromechanical transducer and an elastic body;
a vibrator fixing member configured to hold the vibrator;
a contact member disposed in contact with the vibrator;
a guide portion configured to guide the contact member in a direction in which the contact member moves by relative movement of the vibrator and the contact member, the guide portion including a vibration damping member disposed in the contact member, a movable plate, a rolling member configured to roll in the direction, and a hold member disposed so as to hold the rolling member between the movable plate and the hold member; and
wherein the vibration damping member, the movable plate, the rolling member, and the hold member are disposed in this order, and, in relation to the movable plate, the vibration damping member is disposed on the vibrator side only, and
wherein the contact member, the vibration damping member, and the movable plate are configured to be able to move integrally in relation to the vibrator.

10. The vibration actuator according to claim 9, wherein at least one of the movable plate and the hold member includes a groove in and along which the rolling member rolls in the direction in which the contact member moves.

11. The vibration actuator according to claim 9, wherein at least one of the movable plate, the rolling member, and the hold member contains resin.

12. The vibration actuator according to claim 1, wherein the vibration damping member including a rubber sheet.

13. The vibration actuator according to claim 1, wherein the vibration damping member is in contact with the movable plate.

14. The vibration actuator according to claim 1, wherein the vibration dumping member is in contact with the vibrator fixing member.

15. The vibration actuator according to claim 1, wherein the rolling member is in contact with each of the hold member and the movable plate.

16. The vibration actuator according to claim 9, further comprising:
a pressing portion configured to press the vibrator against the contact member between the vibrator and the vibrator fixing member; and
a vibration isolating member disposed between the pressing portion and the vibrator.

17. The vibration actuator according to claim 9, wherein the vibration damping member including a rubber sheet.

18. The vibration actuator according to claim 9, wherein the vibration damping member is in contact with the movable plate.

19. The vibration actuator according to claim 9, wherein the vibration dumping member is in contact with the vibration fixing member.

20. The vibration actuator according to claim 9, wherein the rolling member is in contact with each of the hold member and the movable plate.

21. The vibration actuator according to claim 1, wherein the vibrator, the vibrator fixing member, the movable plate and the vibration dumping member move relative to each of the contact member and the hold member.

22. The vibration actuator according to claim 9, wherein the contact member, the movable plate and the vibration dumping member move relative to each of the vibrator and the hold member.

23. A vibration actuator, comprising:
a contact member;

a vibrator disposed in contact with the contact member, the vibrator including an electromechanical transducer and an elastic body;
a vibrator fixing member configured to hold the vibrator;
a vibration damping member disposed in the vibrator fixing member;
a movable plate;
a rolling member;
a hold member disposed so as to hold the rolling member between the movable plate and the hold member;
wherein the vibration damping member, the movable plate, the rolling member, and the hold member are disposed in this order
wherein the vibrator, the vibrator fixing member, the vibration damping member, and the movable plate are configured to be able to move integrally in relation to the contact member.

24. The vibration actuator according to claim 23, further comprising:
a pressing portion configured to press the vibrator against the contact member between the vibrator and the vibrator fixing member; and
a vibration isolating member disposed between the pressing portion and the vibrator.

25. The vibration actuator according to claim 24, wherein vibration isolating members each being the vibration isolating member disposed between the pressing portion and the vibrator are disposed so as to be substantially symmetric with respect to a center of the vibrator in the direction in which the vibrator moves.

26. The vibration actuator according to claim 24, wherein the pressing portion includes protrusions on a surface that is in contact with the vibration isolating member, the protrusions being located so as to be substantially symmetric with respect to a center of the vibrator in a direction in which the vibrator moves.

27. The vibration actuator according to claim 23, wherein vibration damping members, each being the vibration damping member disposed between the vibrator fixing member and the movable plate, are disposed between the vibrator fixing member and the movable plate so as to be substantially symmetric with respect to a center of the vibrator in a direction in which the vibrator is driven.

28. The vibration actuator according to claim 23, wherein the vibration damping members are disposed on both end portions of the vibrator fixing member or the movable plate in the direction in which the vibrator is driven.

29. The vibration actuator according to claim 23, wherein at least one of the movable plate and the hold member includes a groove in and along which the rolling member rolls in the direction in which the vibrator moves.

30. The vibration actuator according to claim 23, wherein at least one of the movable plate, the rolling member, and the hold member contains resin.

31. The vibration actuator according to claim 23, wherein the vibration damping member, the movable plate, the rolling member, and the hold member constitute a guide portion.

32. The vibration actuator according to claim 23, wherein the vibration actuator constitutes a linear vibration actuator.

33. A vibration actuator, comprising:
a vibrator including an electromechanical transducer and an elastic body;
a contact member disposed in contact with the vibrator;
a vibration damping member disposed in the contact member;
a movable plate;
a rolling member;
a hold member disposed so as to hold the rolling member between the movable plate and the hold member;
wherein the vibration damping member, the movable plate, the rolling member, and the hold member are disposed in this order,
wherein the contact member, the vibration damping member, and the movable plate are configured to be able to move integrally in relation to the vibrator.

34. The vibration actuator according to claim 33, wherein at least one of the movable plate and the hold member includes a groove in and along which the rolling member rolls in the direction in which the contact member moves.

35. The vibration actuator according to claim 33, wherein at least one of the movable plate, the rolling member, and the hold member contains resin.

36. The vibration actuator according to claim 23, wherein the vibration damping member including a rubber sheet.

37. The vibration actuator according to claim 23, wherein the vibration damping member is in contact with the movable plate.

38. The vibration actuator according to claim 23, wherein the vibration dumping member is in contact with the vibrator fixing member.

39. The vibration actuator according to claim 23, wherein the rolling member is in contact with each of the hold member and the movable plate.

40. The vibration actuator according to claim 33, further comprising:
a pressing portion configured to press the vibrator against the contact member between the vibrator and a vibrator fixing member; and
a vibration isolating member disposed between the pressing portion and the vibrator.

41. The vibration actuator according to claim 33, wherein the vibration damping member including a rubber sheet.

42. The vibration actuator according to claim 33, wherein the vibration damping member is in contact with the movable plate.

43. The vibration actuator according to claim 33, wherein the vibration dumping member is in contact with a vibrator fixing member.

44. The vibration actuator according to claim 33, wherein the rolling member is in contact with each of the hold member and the movable plate.

45. The vibration actuator according to claim 23, wherein the vibrator, the vibrator fixing member, the movable plate and the vibration dumping member move relative to each of the contact member and the hold member.

46. The vibration actuator according to claim 33, wherein the contact member, the movable plate and the vibration dumping member move relative to each of the vibrator and the hold member.

47. The vibration actuator according to claim 23, wherein the vibration damping member, the movable plate, the rolling member, and the hold member constitute a guide portion.

48. The vibration actuator according to claim 23, wherein the vibration actuator constitutes a linear vibration actuator.

* * * * *